United States Patent [19]

Schuierer

[11] 4,102,157
[45] Jul. 25, 1978

[54] APPARATUS FOR REMOVING ORGANIC SOLVENTS FROM TEXTILE MATERIAL

[75] Inventor: Manfred Schuierer, Michelstadt, Germany

[73] Assignee: Bruckner Apparatebau GmbH, Erbach, Germany

[21] Appl. No.: 793,530

[22] Filed: May 4, 1977

[30] Foreign Application Priority Data

May 11, 1976 [DE] Fed. Rep. of Germany ....... 2620815

[51] Int. Cl.² ........................... D06B 3/12; D06B 9/06
[52] U.S. Cl. ...................................... 68/5 D; 68/18 C
[58] Field of Search ............. 68/18 C, 5 C, 5 D, 5 E, 68/18 R; 34/73–76; 134/102, 105, 110; 210/177, 184, 187, 387; 118/61

[56] References Cited

U.S. PATENT DOCUMENTS

| | | | |
|---|---|---|---|
| 354,797 | 12/1886 | Lorimer | 68/5 D X |
| 2,312,910 | 3/1943 | Jennings | 34/73 |
| 2,682,116 | 6/1954 | Dungler | 34/75 X |
| 3,196,642 | 7/1965 | Terhune et al. | 68/5 D |
| 3,318,114 | 5/1967 | Schneider | 68/5 D |
| 3,643,475 | 2/1972 | Stevens, Jr. | 68/18 C |

*Primary Examiner*—Philip R. Coe
*Attorney, Agent, or Firm*—Marshall & Yeasting

[57] ABSTRACT

An apparatus for removing organic solvents from textile material with steam comprises a treatment chamber having a steam inlet at its upper end and a condenser at its lower end.

2 Claims, 2 Drawing Figures

APPARATUS FOR REMOVING ORGANIC SOLVENTS FROM TEXTILE MATERIAL

BACKGROUND OF THE INVENTION

This invention relates to apparatus for removing organic solvents from textile material with steam.

The wet treatment of textile material, for example washing, dyeing, bleaching or finishing, is being carried out to an increasing extent with organic solvents (such as perchlorethylene, methylene chloride or fluorinated hydrocarbons). Not only in view of the high prices of these solvents, but also in the interests of pollution control, the solvents have to be recovered as completely as possible from the textile material after their use.

It is known that such "drying" of the textile material, i.e. the removal of the solvents from the textile material, can be carried out by means of hot air. The hot air carrying solvents is then passed through condensation apparatus and over active carbon in order to recover the solvents.

If, after removal of the solvents, the textile material is intended or allowed to exhibit a certain residual water content, removal of the solvents from the textile material may even be carried out with steam. In such a known process (cf. German Patent Specification as laid open No. 1,610,989), the textile material is exposed in a treatment chamber to the action of hot steam, as a result of which the organic solvents are vaporised. To this end, in one known apparatus, the solvent-containing textile material is passed through the treatment chamber in one direction whilst the steam is passed through in the opposite direction. A mixture of steam and solvent vapour is formed and is subsequently condensed to recover the organic solvent.

One disadvantage of this known apparatus is the relatively high cost involved in condensing the mixture of steam and solvent vapour.

SUMMARY OF THE INVENTION

Accordingly, the object of the present invention is to obviate this disadvantage by constructing the apparatus in such a way that the organic solvents present in the textile material are removed by steam and recovered by particularly simple means and with a low energy demand.

According to the invention, this object is achieved by a treatment chamber which comprises a steam inlet at its upper end and a condenser at its lower end.

The invention makes use of the knowledge that the vapours of the organic solvents primarily involved (such as perchlorethylene, methylene chloride, fluorinated hydrocarbons and combustible organic solvents) have a higher specific gravity than steam. When the solvents are vaporised under the action of the hot steam in the treatment chamber, they sink downwards in the treatment chamber. In other words, a pronounced natural separation of steam and solvent vapour takes place in the treatment chamber. Accordingly, it is essentially the organic solvent vapor accompanied by only traces of steam, which enters the condenser situated at the lower end of the treatment chamber. For this reason, the condenser can be relatively small. In addition, the apparatus according to the invention guarantees a minimal consumption of steam.

The apparatus according to the invention may be used advantageously for removing solvents from continuously moving textile materials (in order to dry the textile material to a residual moisture content), and particularly a solvent having a specific gravity in the vapor phase at about 100° C and at atmospheric pressure which is at least twice that of water vapor. To this end, the treatment chamber is best provided at its lower end with an inlet and, at its upper end, with an outlet for the textile material, which is guided through the treatment chamber with repeated horizontal reversal.

In another advantageous variant of the invention, the apparatus is used for separating a mixture of solvents and impurities, especially a solvent/oil mixture. In this case, at least one textile filter element impregnated with the mixture to be separated is arranged in the treatment chamber.

DESCRIPTION OF THE PREFERRED EMBODIMENTS

Figure 1:
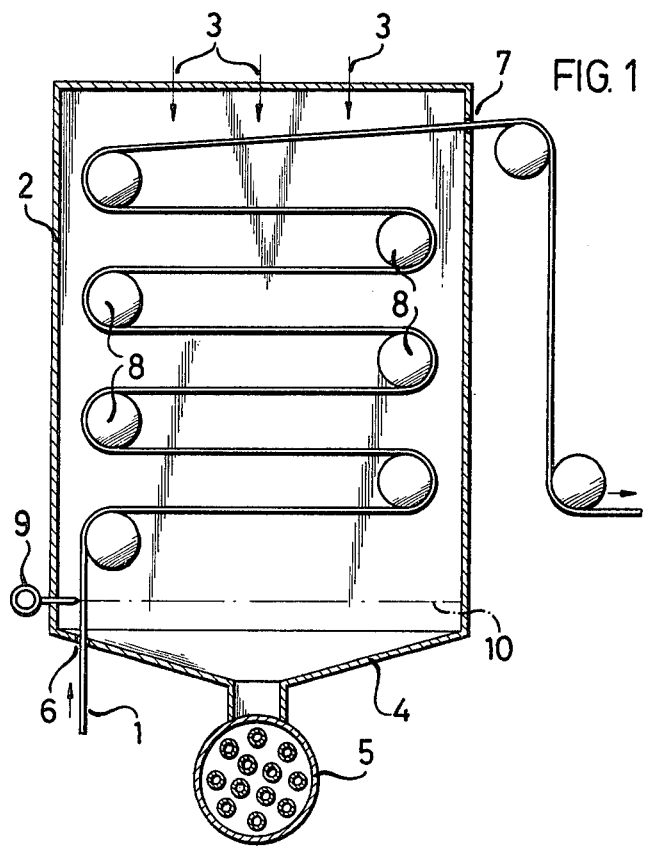
FIG. 1 is a diagrammatic vertical section of an apparatus for removing organic solvents from a continuously moving textile web.

The apparatus shown in FIG. 1 includes a treatment chamber 2 which is provided at its upper end with steam inlets (arrows 3) and, at its lower end, with a funnel-like base 4 adjoined by a condenser 5.

The treatment chamber 2 further includes, at its lower end, an inlet 6 and, at its upper end, an outlet 7 for the textile web 1, which is guided through the treatment chamber 2 with repeated horizontal reversal (reversing rollers 8).

The treatment chamber 2 further comprises at its lower end, but above the condenser 5, a temperature sensor 9 which measures the temperature prevailing at the level 10 in the treatment chamber 2. This temperature sensor 9 is connected to regulating means (not shown) which controls the supply of steam to the treatment chamber 2 so as to maintain a substantially constant predetermined temperature at the sensor 9.

When the apparatus illustrated in FIG. 1 is in operation, the solvent-containing textile web 1 is introduced into the treatment chamber 2 and the treatment chamber 2 is fed with hot steam. The solvent evaporates from the textile web, and sinks downwards in the treatment chamber 2 because it has a higher specific gravity than the steam. The supply of steam to the treatment chamber 2 is regulated in such a way that the steam zone extends downwards substantially to the level 10. If the lower boundary of the steam zone rises above the level 10 (which is detected at the temperature sensor 9 by a reduction in the temperature), more steam is introduced into the treatment chamber 2. Conversely, the supply of steam to the treatment chamber 2 is reduced when the lower boundary of the steam zone falls below the level 10 (which is detected at the temperature sensor 9 by a corresponding increase in the temperature).

The solvent evaporated from the textile web 1, which sinks downwards through the treatment chamber 2 on account of its higher specific gravity, enters the condenser 5 where it is recovered.

In order to intensify the exchange between the steam and the textile material, a screen drum under suction (not shown) may be arranged in the treatment chamber 2 near the inlet 6 for the textile web.

The embodiment illustrated in FIG. 1 essentially produces a countercurrent movement between the solvent-containing textile material and the steam. During its upward movement through the treatment chamber 2, the textile web 1 comes into contact with increasingly hotter and fresher steam (delivered from above).

Figure 2:
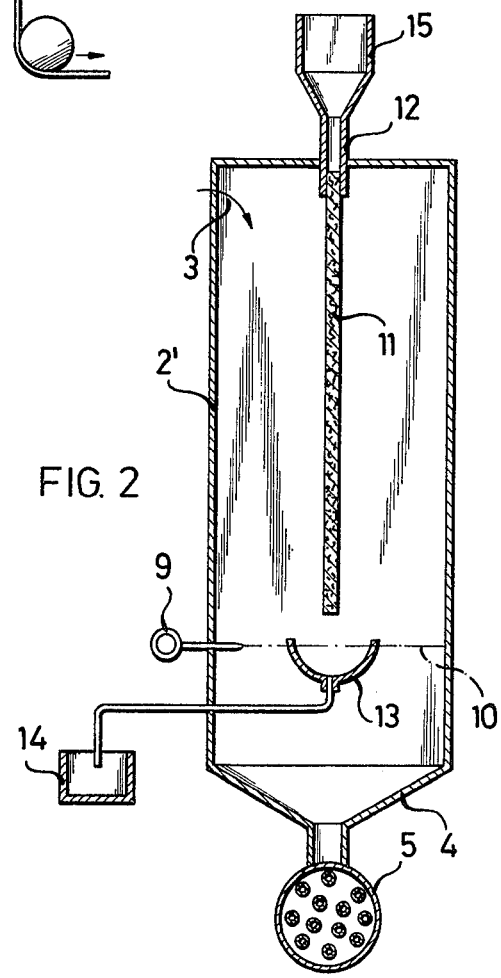
FIG. 2 is a diagrammatic vertical section of an apparatus according to the invention for separating a mixture of solvents and impurities, especially a solvent/oil mixture.

In FIG. 2 a textile filter element 11 impregnated with the mixture to be separated is provided in the treatment chamber 2'. This textile filter element 11, which extends over a considerable part of the height of the treatment chamber 2', is suspended from a feed connection 12 for the mixture to be separated, in the vicinity of the cover of the treatment chamber. Below the filter element 11 there is a collecting bowl 13 for the impurities which leads to a receptacle 14.

In this embodiment, too, the funnel-like base 4 of the treatment chamber 2' leads to a condenser 5. The solvent/oil mixture to be separated is delivered to a funnel-like container 15 from which it passes into the filter element 11 through the connection 12. The supply of steam to the treatment chamber 2' is indicated by the arrow 3. Finally, a temperature sensor 9 is again provided at the level 10.

In the operation of the apparatus illustrated in FIG. 2, the solvent/oil mixture to be separated is delivered to the filter element 11 and hot steam is introduced into the treatment chamber 2' at its upper end. The organic solvent evaporated from the filter element 11 sinks downwards on account of its higher specific gravity, as in the embodiment illustrated in FIG. 1, and enters the condenser 5 largely free from water. The volatile oily constituents of the mixture to be separated drop from the filter element 11 into the collecting bowl 13 and are delivered outwards to the receptacle 14.

In textile technology, there are intallations in which the textile material is wet-treated using organic solvents, the solvent having subsequently to be removed from the textile material and freed from impurities. For installations of this type, i.e. for installations in which not only does the textile material have to be dried, but also the vaporised solvent has to be purified, it is useful to combine the apparatus illustrated in FIGS. 1 and 2. This is because, in this case, the treatment chamber provided at its upper end with the steam inlet and at its lower end with the condenser can form both the space for removing the solvent from the textile material (as illustrated in FIG. 1) and also the space for separating the mixture of solvents and impurities (as illustrated in FIG. 2). In this way, the two described functions may be carried out advantageously in one and the same treatment chamber using a single steam source and a single condenser.

I claim:

1. Apparatus for removing organic solvents from textile material with steam comprising a treatment chamber having an upper end and a lower funnel-shaped end, steam inlet means at said upper end, condenser means at said lower end, a web inlet at said lower end, a web outlet at said upper end, and means for guiding a textile web in a generally upward path from said web inlet to said web outlet.

2. Apparatus according to claim 1 wherein temperature sensor means is provided at the lower end of the chamber above the condenser means for maintaining a steam zone extending from the steam inlet means downwardly substantially to the sensor means.

* * * * *